United States Patent
Geethakumar et al.

(10) Patent No.: US 11,431,514 B1
(45) Date of Patent: Aug. 30, 2022

(54) SYSTEMS FOR DETERMINING AUTHENTICATED TRANSMISSIONS OF ENCRYPTED PAYLOADS

(71) Applicant: AMAZON TECHNOLOGIES, INC., Seattle, WA (US)

(72) Inventors: Sarath Geethakumar, Bellevue, WA (US); Krutarth Mukesh Gathani, Redmond, WA (US); Bruce Cooper, North Perth (AU); Eric Crahen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 163 days.

(21) Appl. No.: 16/867,234

(22) Filed: May 5, 2020

Related U.S. Application Data (60) Provisional application No. 62/844,003, filed on May 6, 2019.

(51) Int. Cl.
| | | |
|---|---|---|
| *H04L 9/32* | (2006.01) | |
| *H04L 9/08* | (2006.01) | |
| *H04L 9/14* | (2006.01) | |

(52) U.S. Cl.
CPC .......... *H04L 9/3273* (2013.01); *H04L 9/0819* (2013.01); *H04L 9/0866* (2013.01);
(Continued)

(58) Field of Classification Search
CPC ... H04L 9/3273; H04L 9/0819; H04L 9/0866; H04L 9/0894; H04L 9/14; H04L 9/3231; H04L 9/3247; H04L 9/3297
(Continued)

(56) References Cited

U.S. PATENT DOCUMENTS

| | | | | |
|---|---|---|---|---|
| 6,920,561 B1 * | 7/2005 | Gould | ..................... | G06F 21/32 |
| | | | | 713/156 |
| 7,571,472 B2 * | 8/2009 | Royer | ..................... | G06F 21/32 |
| | | | | 340/5.52 |

(Continued)

OTHER PUBLICATIONS

"Trusted Base System Architecture, Client (4th Edition) System Hardware on Arm", Arm Limited, Document No. ARM DEN 0021D, Copyright 2012, 2016, 2018, 60 pages. Retrieved from the Internet: URL:https://static.docs.arm.com/den0021/d/DEN0021D%20Trusted_Base_System_Architecture_Client.pdf?_ga=2.64444076.2056451337.1588695647-917336981.1587742306.

(Continued)

*Primary Examiner* — Bryan F Wright
(74) *Attorney, Agent, or Firm* — Lindauer Law, PLLC (57) ABSTRACT

During provisioning of a biometric device, a hardware root of trust is established between the biometric device and a server. The biometric device includes a cryptographic processor with a first encryption key stored in secure storage. The first encryption key is used to establish a mutually authenticated communication channel with the server. A set of additional encryption keys between the device and the server are established via the communication channel. Biometric data generated by the biometric device is encrypted using the additional keys and digitally signed. The server receives the encrypted and signed data via the communication channel and verifies the signature. Once the signature is verified, the biometric data is then decrypted. The server then processes the decrypted biometric data. Data that does not arrive via the communication channel, that fails the verification, or that fails decryption is deleted or disregarded.

20 Claims, 6 Drawing Sheets

(52) U.S. Cl.
CPC .............. *H04L 9/0894* (2013.01); *H04L 9/14* (2013.01); *H04L 9/3231* (2013.01); *H04L 9/3247* (2013.01); *H04L 9/3297* (2013.01)

(58) Field of Classification Search
USPC ......................................................... 713/171
See application file for complete search history.

(56) References Cited

U.S. PATENT DOCUMENTS

| | | | | |
|---|---|---|---|---|
| 8,615,663 | B2* | 12/2013 | Buer | ................... H04L 63/0861 |
| | | | | 713/186 |
| 10,999,066 | B1* | 5/2021 | Griffin | .................. H04L 63/061 |
| 2006/0080549 | A1* | 4/2006 | Okamura | ................ G06F 21/33 |
| | | | | 713/186 |
| 2016/0224779 | A1* | 8/2016 | Kitane | ................ H04L 63/0861 |

OTHER PUBLICATIONS

Greene, James, "Intel Trusted Execution Technology", Hardware-based Technology for Enhancing Server Platform Security, Intel Corporation, Copyright 2010-2012, 8 pages. Retrieved from the internet: URL: https://www.intel.com/content/www/us/en/architecture-and-technology/trusted-execution-technology/trusted-execution-technology-security-paper.html.

\* cited by examiner

SYSTEMS FOR DETERMINING AUTHENTICATED TRANSMISSIONS OF ENCRYPTED PAYLOADS

PRIORITY

The current application claims priority to the United States Provisional Application for patent having Application Ser. No. 62/844,003 filed May 6, 2019. Application 62/844,003 is incorporated by reference herein in its entirety.

BACKGROUND

Various types of facilities may acquire information to identify users before granting entry to the user, allowing the user to purchase an item, allowing the user to access particular items, services, or areas, and so forth. One possible method for identifying a user may include acquiring biometric data from the user, such as a fingerprint, an image of the user's face, hand, or other body part, and so forth. However, because the biometric characteristics of a user are typically unable to be changed, unauthorized use of biometric data may be difficult to detect or prevent.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Identification of a user may be accomplished rapidly and accurately through use of biometric data. Determining a user's identity may serve a variety of purposes. For example, biometric data may be used to access a facility by providing such data at a point of entry. As another example, biometric data may be used to facilitate payment for goods or services, such as by associating the identity of a user with a payment method, then using the payment method to complete a purchase transaction in response to identifying the user. As yet another example, biometric data may be used to sign an electronic record, such as to indicate acceptance of a delivery. Use of biometric data may provide greater security than traditional systems, such as cards that may be lost or stolen or passwords that may be compromised or inadvertently revealed to others. However, because biometric data may be based on characteristics of the user's body, a biometric input for authorizing a user may not be changed as readily as a password. If biometric data becomes compromised, such as by unauthorized access to stored data associated with a computer system, corrective measures may be more difficult to implement than those associated with traditional systems.

Described in this disclosure is a system for ensuring that only device-attested biometric data from a trusted biometric device is processed. While implementations herein describe generating and processing device-attested biometric data, the processes may also be used with any type of payload including other types of data, such as payment data, user data, and so forth. A trusted biometric device generates device-attested biometric data in a secure fashion using hardware root of trust techniques. A server maintains a list of those devices that remain trusted and any devices that are deemed untrusted.

The biometric device includes a cryptographic processor that accesses secure memory storing a device encryption key. For example, a device encryption key may be stored in the secure memory during manufacture or provisioning of the biometric device. Other components of the biometric device may be prevented from accessing the device encryption key. The device encryption key is used to establish a mutually authenticated communication channel with the server. Cryptographic data associated with the device encryption key may be provided to the server with a request to establish the communication channel. The server may store data indicative of encryption keys associated with devices for which establishment of the communication channel is authorized. If the server determines that the cryptographic data is associated with an authorized device, the server may establish the mutually authenticated communication channel with the biometric device. If the server is not able to determine that the cryptographic data is associated with an authorized device or if cryptographic data associated with the device encryption key is absent from the request, the communication channel may not be established.

The biometric device also includes a main processor separate from the cryptographic processor. The main processor may support a trusted execution environment (TEE). After the mutually authenticated communication channel has been established with the server, the main processor and the server may establish one or more data encryption keys. Data encryption keys may include one or more of cryptographic keys used to encrypt data, cryptographic keys used to decrypt data, or cryptographic keys used to both encrypt and decrypt data. For example, a set of data encryption keys may include different cryptographic keys for encrypting and decrypting a payload. As another example, a set of data encryption keys may include one or more public and private cryptographic keys used by devices to establish a shared secret. The server or biometric device may initiate a key derivation protocol to derive the data encryption keys, such as a Diffie-Hellman key exchange, using the mutually authenticated communication channel to exchange data. In some implementations, the TEE may be associated with a private encryption key that may be used to derive one or more data encryption keys that are transmitted to the server. For example, the TEE may derive a public key based on a private encryption key, the public key may be digitally signed by the cryptographic processor using the device encryption key, and the public key may be sent to the server for subsequent use deriving data encryption keys to decrypt data from the TEE. In some implementations, the data encryption keys may expire after a selected number of transactions or after a selected length of time. The server may store data indicative of the data encryption keys established with the biometric device. Other components of the biometric device may be prevented from accessing the data encryption keys within the TEE.

The biometric device uses an input device to acquire biometric data from a user. For example, a camera associated with the biometric device may acquire an image of a hand of the user. In some implementations, the input device may interface directly with the TEE of the biometric device, such as through dedicated hardware, wired connections, and so forth. Other components of the biometric device may be prevented from accessing the biometric data in the TEE. In some implementations, the biometric data may be processed within the TEE by the main processor, such as to determine values or characteristics based on the biometric data. In such a case, the term "biometric data" may include the biometric data acquired using the input device, as well as any values or other data determined based on the acquired biometric data. In other cases, the biometric data may be transmitted to the server without such processing by the main processor.

The biometric device uses the data encryption keys established with the server to encrypt the biometric data. The biometric device may also digitally sign the encrypted biometric data. In some implementations, a data encryption key established by the biometric device and the server may be used to encrypt the biometric data, while the device encryption key of the cryptographic processor may be used to digitally sign the encrypted biometric data. In other implementations, a data encryption key established by the biometric device and the server may be used to both encrypt and sign the biometric data. In other implementations, a first data encryption key established by the biometric device and the server may be used to encrypt the biometric data, and a second data encryption key established by the biometric device and the server may be used to digitally sign the encrypted biometric data.

The process of signing and encrypting the biometric data using mutually established encryption keys and transmitting the biometric data to the server using the mutually authenticated communication channel associates the biometric data with the trusted biometric device from which the biometric data originated. The signed, encrypted biometric data may therefore be referred to as "device-attested biometric data."

The biometric device may transmit the device-attested biometric data to the server using the mutually authenticated communication channel. The characteristics of the device-attested biometric data may enable the server to determine that the device-attested biometric data originated from a trusted biometric device. As a result, the server may only process device-attested biometric data from trusted biometric devices, while preventing processing of biometric data when the server is unable to determine that the biometric data originated from a trusted biometric device.

For example, the server may only process device-attested biometric data received via the mutually authenticated communication channel to determine identity or authenticate a user. Data received via other channels may be deleted, disregarded, or otherwise prevented from further processing. Because establishment of the mutually authenticated communication channel uses the device encryption key associated with the cryptographic processor, security of the system is improved by preventing processing of data received via other channels. For example, even in cases where the device-attested biometric data is valid, the server may refrain from processing the data if it is not received via the mutually authenticated communication channel.

In response to receiving the device-attested biometric data via the mutually authenticated communication channel, the server may determine that the cryptographic signature associated with the device-attested biometric data is based on a valid encryption key. For example, based on the particular communication channel through which the device-attested biometric data was received or a characteristic of the received data, the server may determine that the biometric data was received from the biometric device. The server may then access the encryption keys that are associated with the biometric device and determine whether the cryptographic signature for the device-attested biometric data corresponds to one of the determined encryption keys.

If the cryptographic signature for device-attested biometric data does not correspond to one of the determined encryption keys or is absent, the server may delete or disregard the data. As a result, biometric data that is not cryptographically signed using a determined encryption key may be devalued and prevented from further processing. If the cryptographic signature corresponds to a valid encryption key, the server may attempt to decrypt the device-attested biometric data using one or more of the encryption keys established by the server and biometric device.

If device-attested biometric data may not be successfully decrypted using an established encryption key, the server may delete or disregard the data. However, if the device-attested biometric data is successfully decrypted, in response to successful decryption of the biometric data, the server may then perform a function associated with the decrypted biometric data. For example, a process may be initiated to determine whether the decrypted biometric data corresponds to stored biometric data within a threshold tolerance, such as to identify or authenticate a user, authorize access, and so forth.

The implementations described above may also be combined with other security features to reduce the potential for loss or unauthorized use of biometric data. For example, the biometric device and the server may communicate using mutual transport layer security (TLS) authentication in addition to use of the device encryption key to establish the mutually authenticated communication channel. Continuing the example, TLS authentication may be used to provide a request to the server to establish the mutually authenticated communication channel and exchange data associated with the device encryption. The mutually authenticated communication channel may then be established within the TLS encrypted connection.

The system may also assess timestamp data to determine a replay attack. For example, biometric data may be associated with a first timestamp indicative of a time at which the biometric data is acquired. An indication of the timestamp may be included in the device-attested biometric data that is provided to the server. The server may determine a second timestamp indicative of a time at which the device-attested biometric data is received. If the first timestamp and second timestamp do not correspond within a threshold tolerance, the data may be deleted or otherwise prevented from further processing.

The biometric device may also include one or more features for detecting physical or software-based tampering, damage, removal of components, unauthorized access to data, and so forth. In response to data indicative of such an occurrence, the biometric device may cause the cryptographic processor to delete the device encryption key, preventing use of the device to communicate with the server. In some cases, the biometric device may also delete encryption keys associated with the TEE, biometric data, or other data stored in association with the biometric device. Data indicative of tampering associated with the biometric device may also be provided to the server to cause the server to prevent future use of the device encryption key, or other encryption keys associated with the biometric device.

Additionally, the main processor and cryptographic processor of the biometric device may be cryptographically paired to prevent use of one of the processors if separated from the other processor. For example, the cryptographic processor may be prevented from performing one or more functions unless cryptographic data is received from the main processor and used to verify the main processor. Similarly, the main processor may be prevented from performing one or more functions if data for verifying the cryptographic processor is not received.

Further, while implementations herein describe transmitting signed, encrypted biometric data using a mutually authenticated communication channel, other types of data may also be similarly associated with a trusted device from which the data originated. For example, a payload may include any type of data that may be used to identify or authenticate a user, authorize a transaction, gain access to an item, facility, or service, and so forth. Continuing the example, a payload may include data associated with a payment mechanism, personal data regarding a user, authentication data regarding a user in addition to or in place of biometric data, and so forth. In such a case, a device that acquires or stores such data may establish a mutually authenticated communication channel with a server, as described previously. The device may then encrypt the payload using a data encryption key established with the server, then digitally sign the encrypted payload using a data encryption key or a device encryption key associated with a cryptographic subsystem of the device. The signed, encrypted payload may then be transmitted to the server using the mutually authenticated communication channel.

Illustrative System

Figure 1:
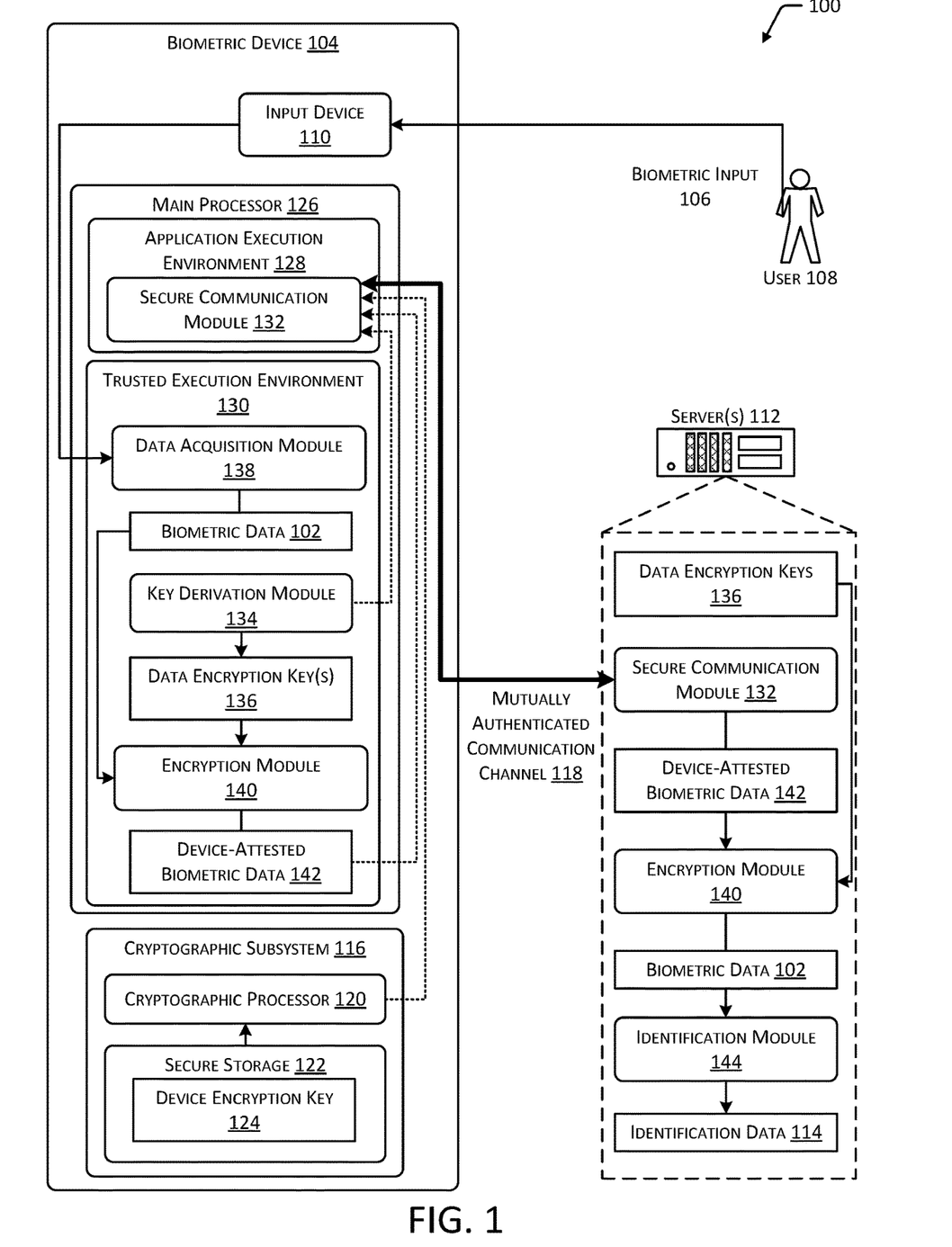
FIG. 1 depicts an implementation of a system for secure acquisition and transmission of biometric data from a biometric device to a server, according to some implementations.

FIG. 1 depicts an implementation of a system 100 for secure acquisition and transmission of biometric data 102 from a biometric device 104 to a server 112. A biometric device 104 may include an input device 110, such as a scanner, fingerprint reader, camera, or other component that may receive a biometric input 106 from a user 108. For example, a user 108 may present a hand within a field of view of a scanner to enable acquisition of an image of the user's palm or fingers. Biometric data 102 determined based on the biometric input 106 may then be communicated to one or more servers 112 to enable identification data 114 associated with the user 108 to be determined, such as to authenticate a transaction, identify the user 108, and so forth. In other implementations, payloads that include other types of data may be communicated to the server(s) 112 using the processes described herein. While FIG. 1 depicts a single server 112, any number of servers 112 may be used. For example, a first server 112 may establish communication with the biometric device 104, a second server 112 may determine identification data 114 based on biometric data 102, and so forth.

To enable secure transmission of the biometric data 102 and to prevent processing of biometric data 102 that is sent to the server(s) 112 from unauthorized sources, the biometric device 104 may use a cryptographic subsystem 116 to establish a mutually authenticated communication channel 118 with the server(s) 112. The cryptographic subsystem 116 may include a cryptographic processor 120 and secure storage 122 (e.g., memory). During manufacture or provisioning of the cryptographic subsystem 116 or biometric device 104, the cryptographic processor 120 may generate a device encryption key 124 and store the device encryption key 124 in secure storage 122. The server(s) 112 and other components of the biometric device 104 may be prevented from accessing the device encryption key 124.

The biometric device 104 may also include one or more additional processors separate from the cryptographic subsystem 116, such as a main processor 126. The main processor 126 may support an application execution environment 128, where an operating system module and other applications, such as a secure communication module 132, may execute. In some implementations, the secure communication module 132 may communicate using mutual transport layer security (TLS) to establish encrypted communication channels with other devices. The main processor 126 may also support a trusted execution environment 130 (TEE), where applications associated with the acquisition, processing, storage, and transmission of biometric data 102 and encryption keys may execute. One example TEE may include Arm TrustZone, created by Arm of Cambridge, UK. Another example TEE may include Intel Trusted Execution Technology, created by the Intel Corporation of Santa Clara, Calif., US. The biometric device 104 may also include one or more power supplies, memories, clocks, network interfaces, input and output devices other than the input device 110, and so forth. In some implementations, the main processor 126 may be incorporated within a system-on-chip (SoC) or other type of integrated circuit that includes the main processor 126, memory, input/output ports, and so forth. The TEE 130 may be isolated from the application execution environment 128 and from the cryptographic subsystem 116, such that encryption keys and biometric data 102 stored in the TEE 130 are not accessible to other components of the biometric device 104. In some implementations, biometric inputs 106 acquired by the input device 110 may be captured directly by the TEE 130, such that the biometric data 102 is not accessed by other components of the biometric device 104.

To transmit biometric data 102 to the server(s) 112, the biometric device 104 and the server(s) 112 may establish a mutually authenticated communication channel 118. The server(s) 112 may refrain from processing biometric data 102 that is received via other channels, ensuring that only data that is received from a device that establishes a mutually authenticated communication channel 118 is used, while other data is deleted or disregarded. As a result, biometric data 102 provided to the server(s) 112 from other sources may be devalued and may not be used to authenticate users 108 or initiate transactions. To establish a mutually authenticated communication channel 118 with the server(s) 112, the biometric device 104 may cause the cryptographic subsystem 116 to generate cryptographic data based on the device encryption key 124 to the secure communication module 132. This data may be transmitted to the server(s) 112, where a secure communication module 132 may receive the data and determine the validity of the data. For example, the server(s) 112 may store encryption keys associated with devices authorized to establish a communication channel with the server(s) 112. If the cryptographic data associated with the device encryption key 124 corresponds to encryption keys stored in the server(s) 112, the server(s) 112 may establish a mutually authenticated communication channel 118 with the biometric device 104. If the cryptographic data associated with the device encryption key 124 is not able to be validated by the server(s) 112 or is absent, the communication channel may not be established.

After establishing the mutually authenticated communication channel 118, one or more key derivation modules 134 associated with the biometric device 104, the server(s) 112, or both the biometric device 104 and the server(s) 112 may be used to establish one or more data encryption keys 136. The data encryption keys 136 established by the biometric device 104 and the server(s) 112 may be separate from the device encryption key 124 of the cryptographic subsystem 116. For example, the data encryption keys 136 may be stored in the TEE 130, and access to the data encryption keys 136 by the cryptographic subsystem 116 and application execution environment 128 may be prevented. In some implementations, the TEE 130 may be associated with a private encryption key, a device encryption key, or other unique encryption key, and this unique encryption key may be used to derive the data encryption keys 136. Additionally, in some implementations, public keys or other data associated with derivation of the data encryption keys 136 that is provided from the TEE 130 to the server(s) 112 may be digitally signed by the cryptographic processor 120, based on the device encryption key 124, to enable the server(s) 112 to validate such data from the TEE 130 upon receipt. Data exchanged between the biometric device 104 and the server(s) 112 may be provided from the key derivation module 134 to the secure communication module 132 for transmission via the mutually authenticated communication channel 118.

When a biometric input 106 is acquired by the input device 110, a data acquisition module 138 executing in the TEE 130 may generate biometric data 102 based on the biometric input 106. In some implementations, one or more applications executing in the TEE 130 may process the biometric data 102, such as by generating data indicative of one or more characteristics or values determined from the biometric data 102. Processing of the biometric data 102 may also include adding or removing portions of the biometric data 102, such as by removing pixels from an image that may not be useful for identifying a user 108, modifying the quality or other characteristics of an image, compressing the biometric data 102, and so forth. In another example, the processing of the biometric data 102 may include use of a neural network to generate one or more feature vectors indicative of features present in the biometric data 102. In other implementations, the biometric data 102 may be stored in the TEE 130 without additional processing, and processing of the biometric data 102 may be performed by the server(s) 112.

An encryption module 140 executing in the TEE 130 may encrypt the biometric data 102 using one of the data encryption keys 136 established with the server(s) 112. In some implementations, the encryption module 140 may also digitally sign the encrypted biometric data 102 using the same data encryption key 136 or a different data encryption key 136. In other implementations, the encrypted biometric data 102 may be provided to the cryptographic subsystem 116, and the device encryption key 124 may be used to digitally sign the encrypted biometric data 102. The signed, encrypted biometric data 102, through use of the cryptographic signature, data encryption key 136, and mutually authenticated communication channel 118 established using the device encryption key 124, may be referred to as device-attested biometric data 142. The biometric device 104 may, using the secure communication module 132, provide the device-attested biometric data 142, via the mutually authenticated communication channel 118, to the server(s) 112. As described previously, the server(s) 112 may delete or refrain from processing data received via channels other than the mutually authenticated communication channel 118.

The encryption module 140 associated with the server(s) 112 may determine that the cryptographic signature associated with the device-attested biometric data 142 is based on a valid encryption key, such as the device encryption key 124 or one of the mutually-established data encryption keys 136. For example, the server(s) 112 may determine the particular biometric device 104 from which the device-attested biometric data 142 was received, and the data encryption keys 136 that are associated with the determined biometric device 104. If the cryptographic signature is not associated with one of the determined data encryption keys 136, the device-attested biometric data 142 may be deleted or prevented from further processing. If the cryptographic signature is determined to be valid, the encryption module 140 may attempt to decrypt the device-attested biometric data 142. If the device-attested biometric data 142 may not be decrypted using a data encryption key 136 established with the biometric device 104, the device-attested biometric data 142 may be deleted or prevented from further processing. If the device-attested biometric data 142 may be decrypted using a data encryption key 136, the decrypted biometric data 102 may be used to perform a function, such as identifying the user 108. For example, FIG. 1 depicts the server(s) 112 including an identification module 144 that generates the identification data 114 based on the decrypted biometric data 102.

Figure 2A:
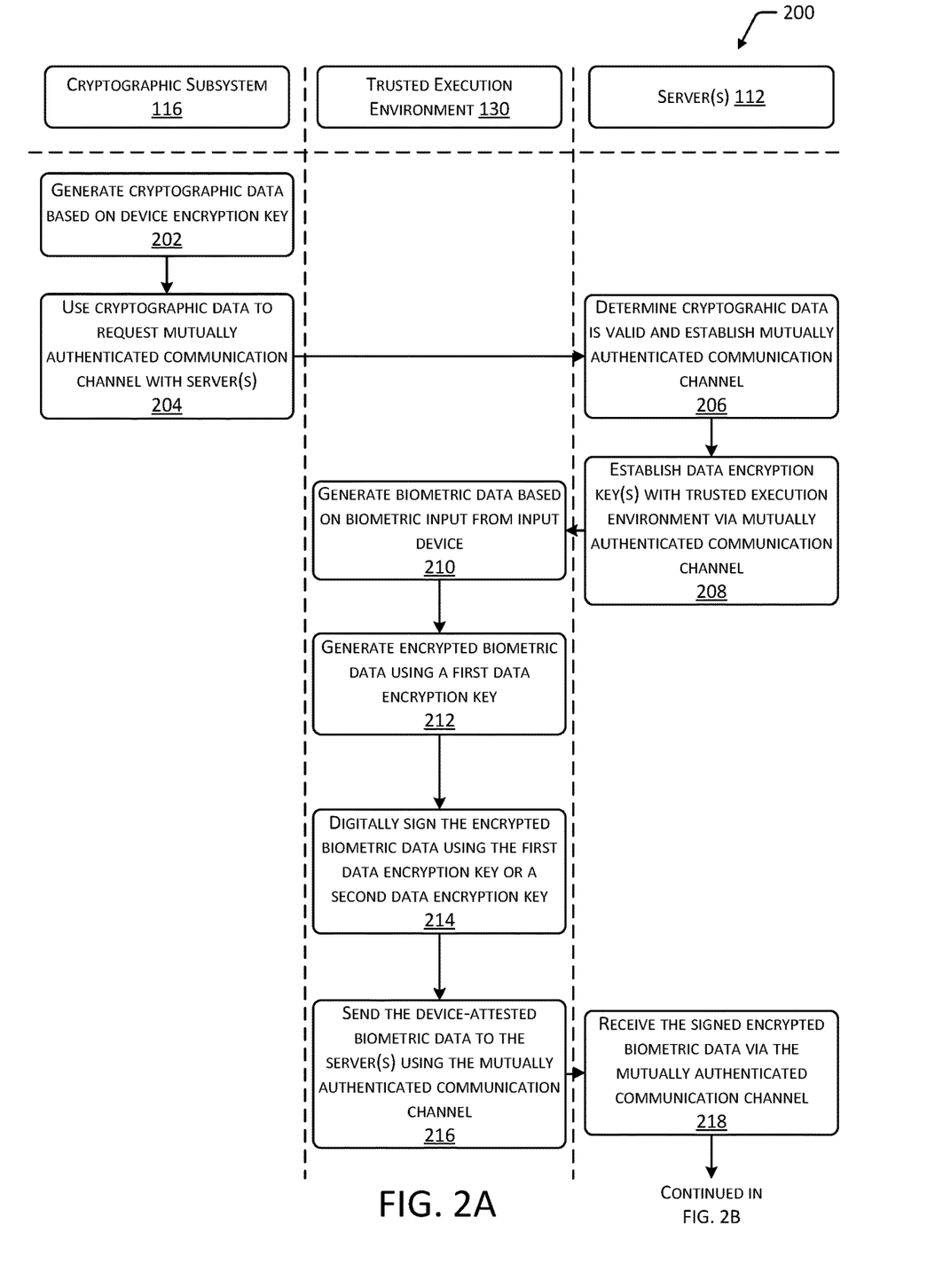
FIGS. 2A and 2B are flow diagrams of a process for secure acquisition, transmission, and processing of biometric data performed by a cryptographic subsystem of the biometric device, a trusted execution environment of the biometric device, and one or more servers, according to some implementations.

FIG. 2A is a flow diagram 200 of a process for secure acquisition and transmission of biometric data 102 performed by a cryptographic subsystem 116 of the biometric device 104, a trusted execution environment (TEE) 130 of the biometric device 104, and one or more servers 112. At 202, the cryptographic subsystem 116 may generate cryptographic data based on a device encryption key 124. For example, the TEE 130, main processor 126, secure communication module 132, or other component of the biometric device 104 may send a request for cryptographic data to the cryptographic subsystem 116. As described with regard to FIG. 1, the cryptographic data from the cryptographic subsystem 116 may be used to establish a mutually authenticated communication channel 118 with the server(s) 112. For example, when the biometric device 104 is activated, at a time when a biometric input 106 is acquired, or at a time when a transaction associated with biometric data 102 is to be initiated, the biometric device 104 may attempt to establish the a mutually authenticated communication channel 118 with the server(s) 112 using cryptographic data from the cryptographic subsystem 116. The cryptographic subsystem 116 may include secure storage 122 that stores the device encryption key 124, while other components of the biometric device 104, and the server(s) 112, may be prevented from access to the device encryption key 124. In some implementations, the device encryption key 124 may be generated in the secure storage 122 during manufacture or provisioning of the cryptographic subsystem 116 or of the biometric device 104.

As 204, the cryptographic subsystem 116 may use the cryptographic data to request the mutually authenticated communication channel 118 with the server(s) 112. For example, the secure communication module 132 may generate a request to establish the mutually authenticated communication channel 118. The request may indicate or identify the biometric device 104 and, in some cases, one or more characteristics of the communication channel to be established. The cryptographic data from the cryptographic subsystem 116 may be transmitted as part of the request or in addition to the request and used by the server(s) 112 to verify that the request originated from a biometric device 104 for which establishment of the communication channel is authorized.

At 206, the server(s) 112 may determine that the cryptographic data is valid and establish the mutually authenticated communication channel 118 with the TEE 130. For example, the server(s) 112 may determine that the cryptographic data corresponds to an encryption key associated with the biometric device 104. The server(s) 112 may maintain data indicative of biometric devices 104 for which establishment of a communication channel is authorized and encryption keys associated with the biometric devices 104. In some cases, based on an identifier or other indication of the biometric device 104 included in the request, the server(s) 112 may access a particular encryption key associated with the biometric device 104 and determine whether the cryptographic data corresponds to the particular encryption key. In other cases, the request may not identify the biometric device 104, and if any valid encryption key stored by the server(s) 112 is associated with the cryptographic data, the mutually authenticated communication channel 118 may be established.

At 208, the server(s) 112 may establish one or more data encryption keys 136 with the TEE 130 via the mutually authenticated communication channel 118. For example, the server(s) 112 or the TEE 130 may initiate a key derivation protocol, such as a Diffie-Hellman key exchange. The server(s) 112 and TEE 130 may exchange data using the mutually authenticated communication channel 118 to establish the data encryption key(s) 136. The TEE 130 may prevent access to the data encryption key(s) 136 by other components of the biometric device 104. In some implementations, one or more of the data encryption keys 136 may be generated based on a private encryption key or device encryption key associated with the TEE 130. Additionally, in some implementations, public keys or other data associated with the generation of the data encryption keys 136 may be digitally signed by the cryptographic subsystem 116 using the device encryption key 124. Use of the device encryption key 124 to digitally sign data associated with generation of the data encryption keys 136 may enable the server(s) 112 to verify that the data associated with generation of the data encryption keys 136 originates from a trusted biometric device 104.

At 210, the TEE 130 may generate biometric data 102 based on a biometric input 106 received from an input device 110. For example, a user 108 may interact with an input device 110 to provide the biometric input 106, such as by placing a body part within a field of view of a scanner or camera. The biometric input 106 from the input device 110 may be captured directly by the data acquisition module 138 of the TEE 130, such that the biometric data 102 is not accessed by the application execution environment 128 or cryptographic subsystem 116. In some implementations, the biometric data 102 may be processed in the TEE 130, such as by determining one or more characteristics or values based on the biometric data 102, adding or removing portions of the biometric data 102, modifying one or more characteristics of the biometric data 102, compressing the biometric data 102, and so forth. In other implementations, the biometric data 102 may be stored in the TEE 130 without additional processing.

At 212, the TEE 130 may generate encrypted biometric data 102 using a first data encryption key 136 established by the TEE 130 and the server(s) 112. At 214, the TEE 130 may digitally sign the encrypted biometric data 102 using the first data encryption key 136 or a second data encryption key 136. In some implementations, the biometric data 102 may be encrypted and associated with a cryptographic signature using the same data encryption key 136. In other implementations, different data encryption keys 136 may be used for encrypting and digitally signing the biometric data 136. Use of data encryption keys 136 that were mutually established by the biometric device 104 and the server(s) 112 to sign and encrypt the biometric data 102, in combination with transmission of the biometric data 102 via the mutually authenticated communication channel 118, may strongly associate the biometric data 102 with the biometric device 104. The signed, encrypted biometric data 102 may therefore be referred to as device-attested biometric data 142, which may be processed by the server(s) 112, while other biometric data 102 that is not correlated with the biometric device 104 may be prevented from processing.

At 216, the TEE 130 may send the device-attested biometric data 142 to the server(s) 112 using the mutually authenticated communication channel 118. At 218, the server(s) 112 may receive the device-attested biometric data 142 using the mutually authenticated communication channel 118.

Figure 2B:
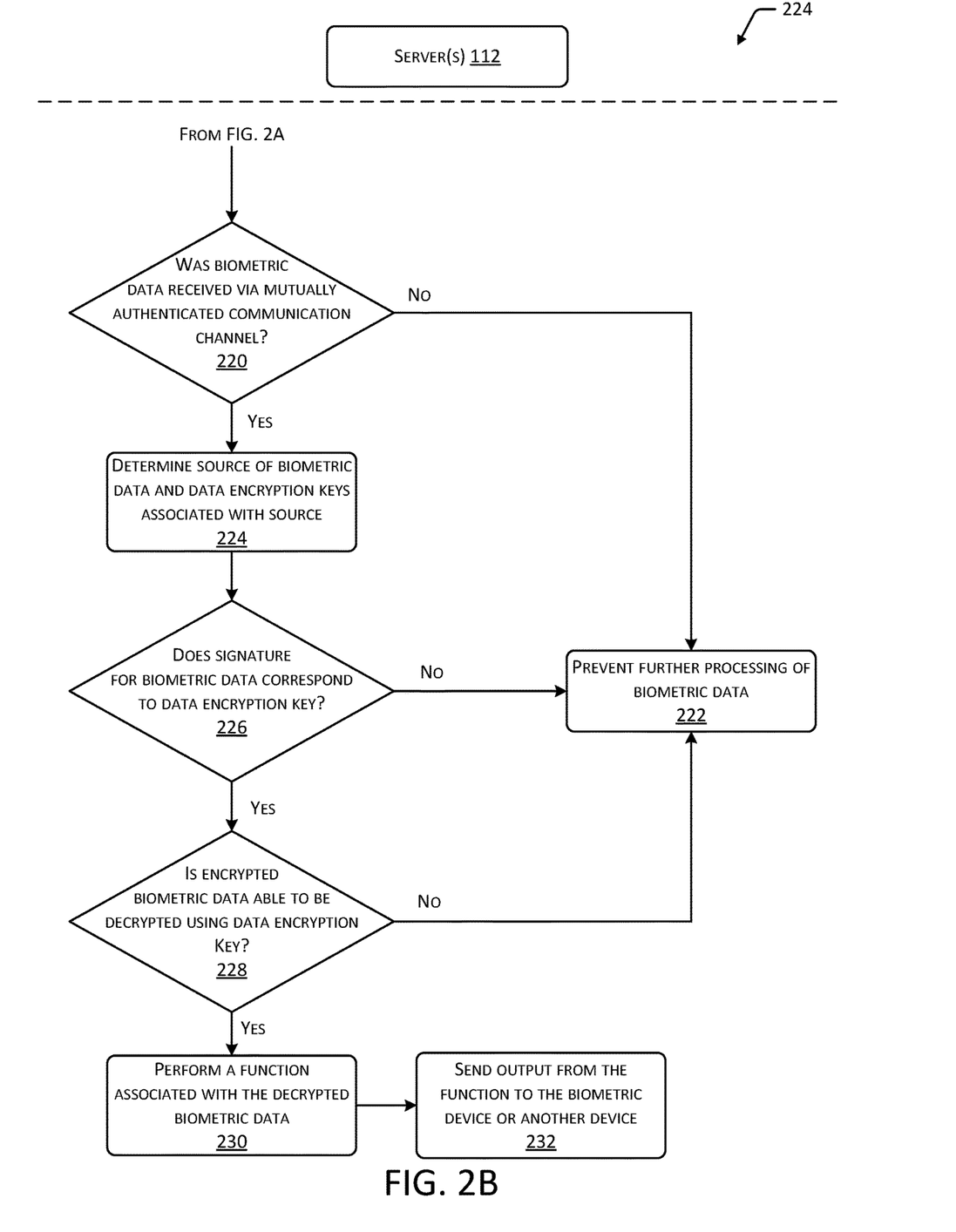

FIG. 2B is a flow diagram 224 of a method for processing received biometric data 102 by one or more servers 112 after receipt of the biometric data 102 from a biometric device 104. At 220, the server(s) 112 may determine whether the biometric data 102 was received via a mutually authenticated communication channel 118. If the biometric data 102 was not received via the mutually authenticated communication channel 118, the method may proceed to 222, and the server(s) 112 may prevent further processing of the biometric data 102. Prevention of further processing may include deleting the biometric data 102, disregarding the biometric data 102, taking one or more security actions, or combinations thereof. Security actions may include preventing further communications by a source of the biometric data 102, preventing use of encryption keys associated with the source of the biometric data 102, generating alarms or notifications, preventing further use of specific biometric data 102 that was received, and so forth.

If the biometric data 102 was received via the mutually authenticated communication channel 118, the method may proceed to 224, and the server(s) 112 may determine the source of the biometric data 102 and the data encryption keys 136 associated with the source. For example, based on a characteristic of the biometric data 102 or of the communication channel that was used, the server(s) 112 may determine the biometric device 104 associated with the biometric data 102. The server(s) 112 may then access the data encryption key(s) 136 that were established with the determined biometric device 104. At 226, the server(s) 112 may determine if the cryptographic signature for the biometric data 102 corresponds to a data encryption key 136 established with the biometric device 104. If the cryptographic signature associated with the biometric data 102 does not correspond to an established data encryption key 136, the method may proceed to 222 and further processing of the biometric data 102 may be prevented.

If the cryptographic signature associated with the biometric data 102 corresponds to an established data encryption key 136, the method may proceed to 228, and the server(s) 112 may determine if the encrypted biometric data 102 is able to be decrypted using an established data encryption key 136. If an established data encryption key 136 is not usable to decrypt the encrypted biometric data 102, the method may proceed to 222 and further processing of the biometric data 102 may be prevented.

If an established data encryption key 136 may be used to decrypt the encrypted biometric data 102, the method may proceed to 230, and the server(s) 112 may perform a function associated with the decrypted biometric data 102. For example, the server(s) 112 may generate identification data 114 based on the biometric data 102, authenticate a user 108, authorize a transaction, and so forth. In some implementations, as shown at 232, the server(s) 112 may send output from the function to the biometric device 104 or to another device. For example, the biometric device 104 that received the biometric input 106, or another computing device associated with a user 108, may be configured to present an indication of a successful or unsuccessful authentication.

Figure 3:
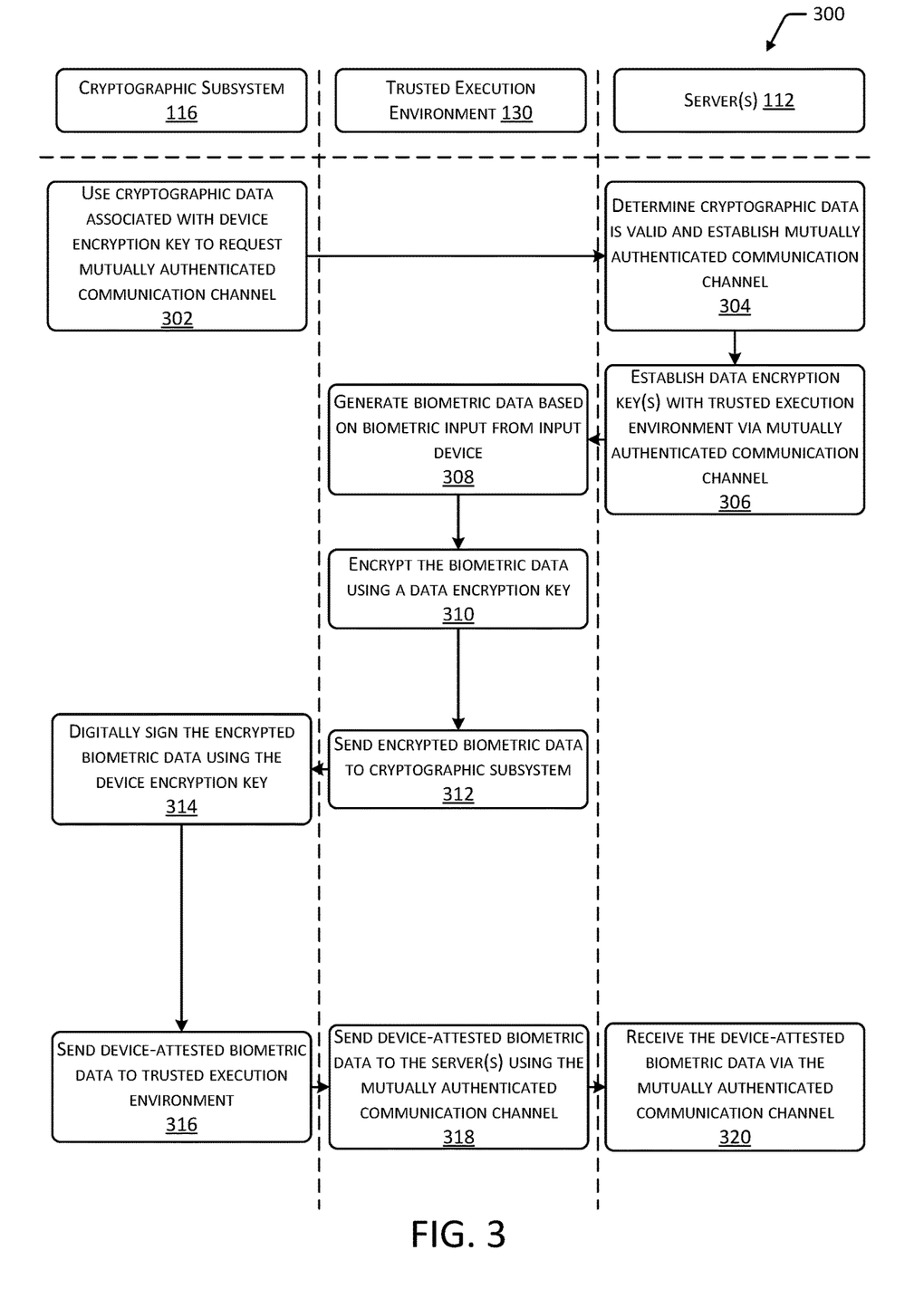
FIG. 3 is a flow diagram of a process in which a trusted execution environment of a biometric device is used to encrypt the biometric data while a cryptographic subsystem of the biometric device is used to digitally sign the biometric data, according to some implementations.

FIG. 3 is a flow diagram 300 of a process in which a trusted execution environment 130 of a biometric device 104 is used to encrypt the biometric data 102 while a cryptographic subsystem 116 of the biometric device 104 is used to digitally sign the biometric data 102. At 302, the cryptographic subsystem 116 may use cryptographic data associated with a device encryption key 124 to request establishment of a mutually authenticated communication channel 118 with the server(s) 112. For example, the cryptographic subsystem 116 may provide cryptographic data to a secure communication module 132 associated with the biometric device 104, which may send the cryptographic data to the server(s) 112 as part of a request to establish the mutually authenticated communication channel 118. In other cases, the cryptographic subsystem 116 may provide the cryptographic data based on a request from the server(s) 112, or in response to the biometric device 104 acquiring a biometric input 106.

At 304, the server(s) 114 may determine that the cryptographic data is valid and establish the mutually authenticated communication channel 118 with the biometric device 104. For example, as described with regard to FIG. 2A, if the server(s) 112 determine that the cryptographic data is associated with the device encryption key 124 of the cryptographic subsystem 116, this determination may indicate that the request originated from a biometric device 104 that is authorized to establish a communication channel with the server(s) 112.

At 306, the server(s) 112 may establish one or more data encryption keys 136 with the trusted execution environment 130 via the mutually authenticated communication channel 118. The server(s) 112 or the TEE 130 may initiate a key derivation protocol or another process for establishing data encryption keys 136, and may generate any number or type of data encryption keys 136. In some implementations, data exchanged between the TEE 130 and the server(s) 112, such as public keys or other types of data, may be digitally signed using the device encryption 124 key of the cryptographic subsystem 116. The digital signature of this data may then be validated by the server(s) 112 when establishing the data encryption keys 136.

At 308, the TEE 130 may generate biometric data 102 based on a biometric input 106 received from an input device 110. In some implementations, the biometric data 102 may be processed in the TEE 130. In other implementations, the biometric data 102 may be stored in the TEE 130 without additional processing.

At 310, the TEE 130 may encrypt the biometric data 102 using a data encryption key 136 established with the server(s) 112. As shown in FIG. 3, in some implementations, rather than digitally signing the encrypted biometric data 102 using an established data encryption key 136, the encrypted biometric data 102 may be digitally signed using the device encryption key 124 of the cryptographic subsystem 116.

At 312, the TEE 130 may send the encrypted biometric data 102 to the cryptographic subsystem 116. At 314, the cryptographic subsystem 116 may digitally sign the encrypted biometric data 102 using the device encryption key 124. Use of the device encryption key 124 associated with the cryptographic subsystem 116 to digitally sign the biometric data 102 may provide additional security due to the inability of other devices or other components of the biometric device 104 to access the device encryption key 124. As described previously, digitally signing the encrypted biometric data 102, to be transmitted via the mutually authenticated communication channel 118, may strongly couple the biometric data 102 with the biometric device 104. The signed, encrypted biometric data 102 may therefore be referred to as device-attested biometric data 142.

At 316, the cryptographic subsystem 116 may send the device-attested biometric data 142 to the TEE 130. At 318, the TEE 130 may send the device-attested biometric data 142 to the server(s) 112 via the mutually authenticated communication channel 118. At 320, the server(s) 112 may receive the device-attested biometric data 142 via the mutually authenticated communication channel 118. As described with regard to FIG. 2B, the server(s) 112 may then determine that the biometric data 102 was received via the mutually authenticated communication channel 118, the cryptographic signature associated with the biometric data 102 is based on the device encryption key 124, and the encrypted biometric data 102 is able to be decrypted using a data encryption key 136 established with the biometric device 104.

Figure 4:
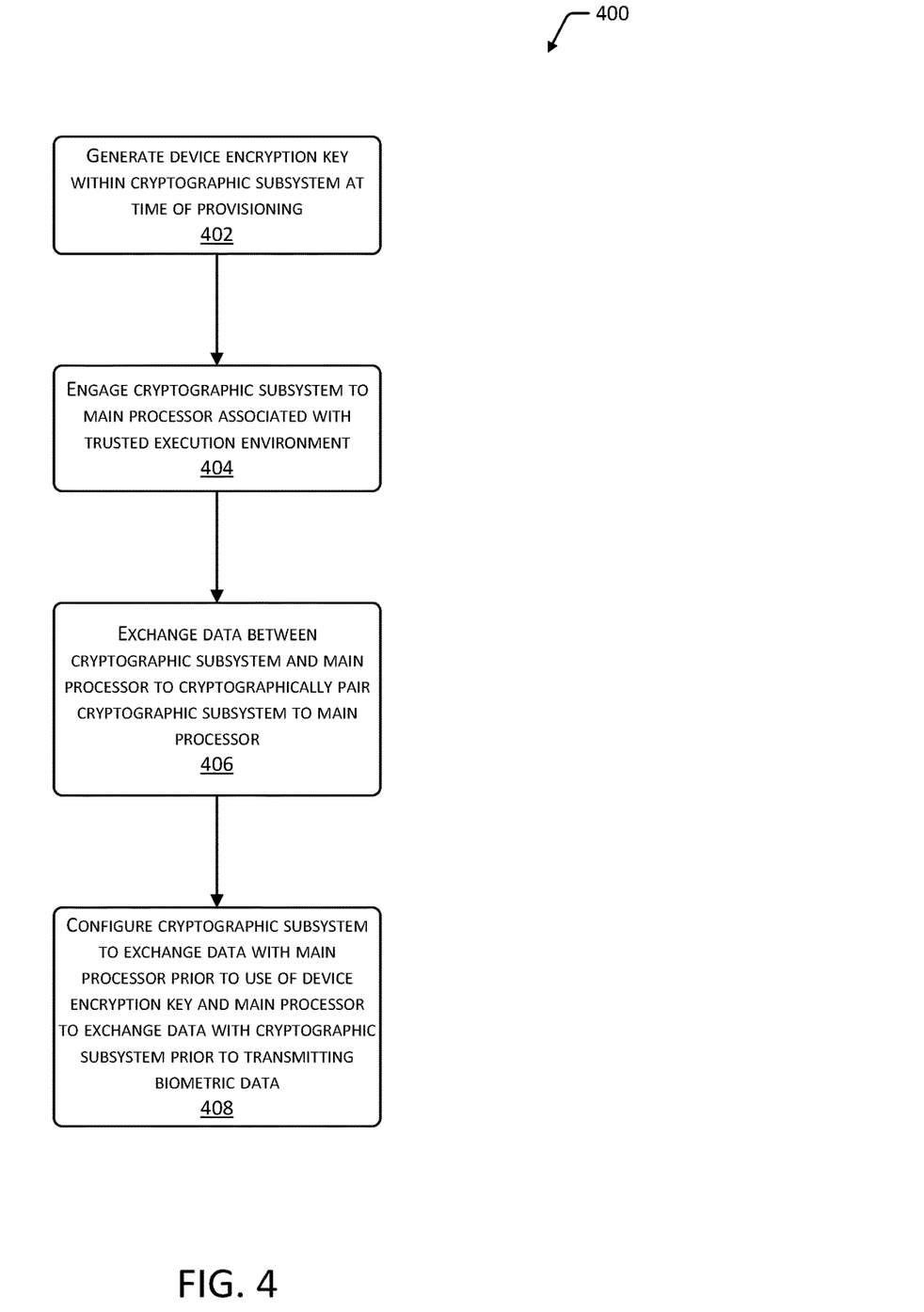
FIG. 4 is a flow diagram of a method for cryptographically pairing a cryptographic subsystem of a biometric device with a main processor of the biometric device to prevent individual operation of the cryptographic subsystem or main processor, according to some implementations.

FIG. 4 is a flow diagram 400 of a method for cryptographically pairing a cryptographic subsystem 116 of a biometric device 104 with a main processor 126 of the biometric device 104 to prevent individual operation of the cryptographic subsystem 116 or main processor 126. For example, after cryptographically pairing a cryptographic subsystem 116 with the main processor 126 of a biometric device 104, the cryptographic subsystem 116 may be prevented from utilizing a device encryption key 124 unless cryptographic data from the main processor 126 is received. Similarly, the main processor 126 may be prevented from performing one or more functions, such as transmission of biometric data 102 or use of data encryption keys 136, unless cryptographic data from the cryptographic subsystem 116 is received. As a result, if a single component of a biometric device 104 were to become compromised, the encryption keys and biometric data 102 associated with the component could not be used independent of the other components of the biometric device 104.

At 402, a device encryption key 124 may be generated within a cryptographic subsystem 116 at the time of provisioning of the cryptographic subsystem 116, or of the biometric device 104 that includes the cryptographic subsystem 116. For example, at the time that a biometric device 104 is provisioned for use, a cryptographic processor 120 may generate a device encryption key 124 that is stored in secure storage 122 of the cryptographic subsystem 116. Generation and storage of the device encryption key 124 by the cryptographic processor 120, without access to the device encryption key 124 by users 108, by other devices, or by other components of the biometric device 104, may improve the security of the biometric device 104. A corresponding encryption key or other types of data indicative of the device encryption key 124 may be stored in the server(s) 112. The device encryption key 124 may subsequently be used to establish a mutually authenticated communication channel 118 between the biometric device 104 and the server(s) 112, as described with regard to FIGS. 1-3. The device encryption key 124 may also be used to digitally sign biometric data 102, as described with regard to FIG. 3.

At 404, the cryptographic subsystem 116 and the main processor 126 may be engaged, such as through a wired connection, to enable a secure exchange of data between the cryptographic subsystem 116 and the main processor 126 and prevent access to the exchanged data by other devices.

At 406, data may be exchanged between the cryptographic subsystem 116 and the main processor 126 to cryptographically pair the cryptographic subsystem 116 to the main processor 126. For example, the cryptographic subsystem 116 and the main processor 126 may mutually establish one or more encryption keys, exchange encrypted data using associated encryption keys, and so forth, to enable each of the cryptographic subsystem 116 and the main processor 126 to verify the presence of the other component. Continuing the example, prior to performing a function, such as use of the device encryption key 124, the cryptographic subsystem 116 may exchange cryptographic data with the main processor 126. If data received from the main processor 126 is able to be validated by the cryptographic subsystem 116 such as by using an established encryption key, the cryptographic subsystem 116 may perform a selected function. In a similar manner, the main processor 126 may exchange data with the cryptographic subsystem 116 and validate the data from the cryptographic subsystem 116 prior to performing one or more functions.

At 408, the cryptographic subsystem 116 may be configured to exchange data with the main processor 126 prior to use of the device encryption key 124, and the main processor 126 may be configured to exchange data with the cryptographic subsystem 116 prior to transmitting biometric data 102.

Figure 5:
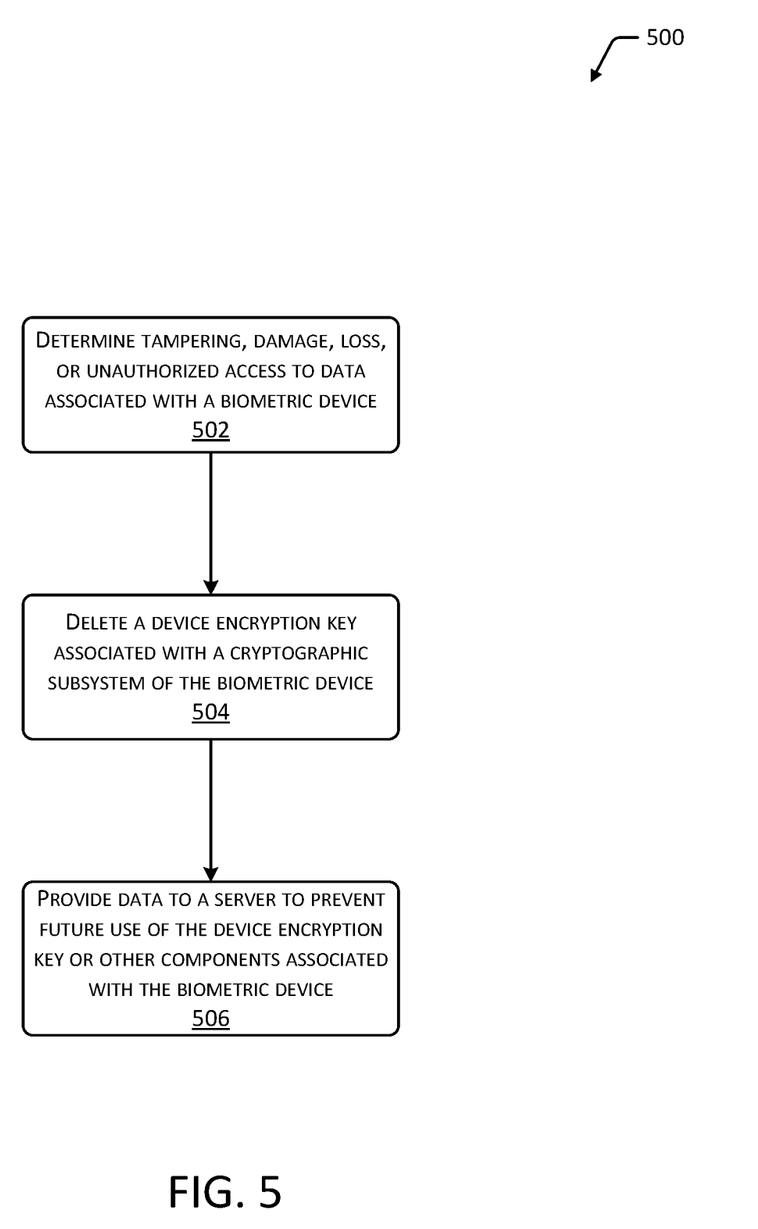
FIG. 5 is a flow diagram of a method for performing functions to remove data from the biometric device and prevent use of encryption keys or biometric data associated with the biometric device in cases of tampering or loss, according to some implementations.

FIG. 5 is a flow diagram 500 of a method for performing functions to remove data from the biometric device 104 and prevent use of encryption keys or biometric data 102 associated with the biometric device 104 in cases of tampering or loss. At 502, tampering, damage, loss, or unauthorized access to data associated with a biometric device 104 may be determined. For example, a biometric device 104 may include one or more pins, wires, fasteners, sensors, and so forth that may be used to detect unauthorized opening of a housing associated with the biometric device 104, impact to the biometric device 104, movement of the biometric device 104 beyond a threshold amount or greater than a threshold speed, and so forth. The biometric device 104 may also include sensors to determine removal of components from the biometric device 104. In some cases, the biometric device 104 may include modules for detecting unauthorized attempts to access data stored in the biometric device 104. In other cases, the biometric device 104 may be configured to determine loss of access to a particular network, a failure to communicate with one or more devices associated with the network, and so forth. In response to a determination of tampering, damage, loss, or unauthorized access to data, the biometric device 104 may perform one or more functions to prevent unauthorized use of biometric data 102 or encryption keys associated with the biometric device 104.

At 504, in response to data indicative of tampering, damage, loss, or unauthorized access to data, the biometric device 104 may delete a device encryption key 124 associated with a cryptographic subsystem 116 of the biometric device 104. In some implementations, the biometric device 104 may also delete one or more data encryption keys 136, stored biometric data 102, stored device-attested biometric data 142, a private key or device encryption key associated with the TEE 130, and so forth. Deletion of data from the biometric device 104 may prevent unauthorized access to and use of the deleted data.

At 506, the biometric device 104 may provide data to a server 112 to prevent future use of the device encryption key 124 or other components associated with the biometric device 104. For example, in response to data indicative of tampering, damage, loss, or unauthorized access to data from the biometric device 104, the server(s) 112 may prevent future attempts to establish a communication channel using the device encryption key 124 of the biometric device 104. In some cases, the server(s) 112 may prevent use of established data encryption keys 136 associated with the biometric device 104. As a result, if a biometric device 104 becomes compromised, data associated with the biometric device 104 may not be used to initiate or authenticate transactions associated with biometric data 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a first device comprising:
      an input device to acquire biometric data;
      a cryptographic processor comprising a secure memory storing a first encryption key; and
      one or more first hardware processors executing first computer-executable instructions to:
         establish, using the cryptographic processor and the first encryption key, a mutually authenticated communication channel with a server;
         using the mutually authenticated communication channel, establish a second encryption key with the server;
         acquire the biometric data using the input device;
         generate, using the second encryption key, encrypted biometric data from the biometric data;
         provide the encrypted biometric data to the cryptographic processor and use the cryptographic processor to digitally sign the encrypted biometric data using the first encryption key to form signed encrypted biometric data, wherein the first encryption key is not accessible to the one or more first hardware processors; and
         send the signed encrypted biometric data to the server using the mutually authenticated communication channel; and
   the server comprising:
      one or more second hardware processors executing second computer-executable instructions to:
         based on the first encryption key, establish the mutually authenticated communication channel with the first device;
         using the mutually authenticated communication channel, establish the second encryption key with the first device;
         receive the signed encrypted biometric data from the first device using the mutually authenticated communication channel;
         in response to receiving the signed encrypted biometric data using the mutually authenticated communication channel, determine that a cryptographic signature associated with the signed encrypted biometric data corresponds to the first encryption key;
         in response to determining that the cryptographic signature associated with the signed encrypted biometric data corresponds to the first encryption key, determine that the second encryption key corresponds to encryption of the signed encrypted biometric data; and
         in response to determining that the second encryption key corresponds to the encryption of the signed encrypted biometric data, process the signed encrypted biometric data to determine identification data.

2. The system of claim 1, wherein during manufacture, the cryptographic processor generates the first encryption key and is provided with first data indicative of the one or more first hardware processors, and the one or more first hardware processors are provided with second data indicative of the cryptographic processor, the first device further comprising first computer-executable instructions to:
   determine, using the cryptographic processor, third data indicative of the one or more first hardware processors;
   determine, using the cryptographic processor, that the third data corresponds to the first data, wherein the cryptographic processor establishes the mutually authenticated communication channel with the server based on correspondence between the third data and the first data;
   determine, using the one or more first hardware processors, fourth data indicative of the cryptographic processor; and
   determine, using the one or more first hardware processors, that the fourth data corresponds to the second data, wherein the one or more first hardware processors establish the second encryption key with the server based on correspondence between the second data and the fourth data.

3. The system of claim 1, wherein the first device includes a trusted execution environment executing on the one or more first hardware processors, the second encryption key is established using the trusted execution environment, and the trusted execution environment restricts access to the second encryption key by at least one other component of the first device.

4. A system comprising:
   a first device comprising:
      one or more first hardware processors executing first computer-executable instructions to:
         receive, from a second device, cryptographic data associated with a first encryption key;

determine that the cryptographic data is associated with the first encryption key;

in response to the cryptographic data being associated with the first encryption key, establish a mutually authenticated communication channel with the second device;

using the mutually authenticated communication channel, establish one or more second encryption keys with the second device;

using the mutually authenticated communication channel, receive a payload from the second device;

in response to receipt of the payload using the mutually authenticated communication channel, determine that a cryptographic signature associated with the payload corresponds to the first encryption key;

in response to determining that the cryptographic signature corresponds to the first encryption key, decrypt the payload using the one or more second encryption keys; and in response to successful decryption of the payload using the one or more second encryption keys, perform a function using the payload.

5. The system of claim 4, further comprising first computer-executable instructions to:

receive data indicative of one or more of tampering, loss, or damage associated with the second device, from one or more of:
the second device; or
a third device in communication with the first device; and in response to the data indicative of the one or more of the tampering, loss, or damage, terminate the mutually authenticated communication channel and disallow further use of the first encryption key.

6. The system of claim 4, further comprising first computer-executable instructions to:

determine that the payload was received from the second device, based on one or more of:
the mutually authenticated communication channel used to receive the payload; or
a characteristic of the payload;

determine that the one or more second encryption keys are associated with the second device; and in response to determining that the payload was received from the second device, access the one or more second encryption keys.

7. The system of claim 4, wherein the payload includes one or more first images, the system further comprising first computer-executable instructions to:

determine correspondence between the one or more first images and previously stored data associated with an identifier; and generate an output indicative of the correspondence.

8. The system of claim 4, further comprising first computer-executable instructions to:

determine that a first timestamp associated with acquisition of the payload is within a threshold value of a second timestamp associated with receipt of the payload, wherein the payload is processed by the first device in response to the first timestamp being within the threshold value of the second timestamp.

9. The system of claim 4, wherein the second device comprises:

a cryptographic processor associated with the first encryption key; and one or more second hardware processors executing second computer-executable instructions to:

establish the mutually authenticated communication channel with the first device using the first encryption key;

establish the one or more second encryption keys with the first device;

receive the payload from an input device;

encrypt the payload using the one or more second encryption keys;

provide the payload to the cryptographic processor to cause the cryptographic processor to digitally sign the payload using the first encryption key; and transmit the payload to the first device.

10. A system comprising:

a first device comprising:

a first hardware processor associated with a first encryption key; and at least one second hardware processor executing first computer-executable instructions to:

establish, using the first encryption key associated with the first hardware processor, a mutually authenticated communication channel with a second device;

establish one or more second encryption keys with the second device;

generate an encrypted payload using an acquired payload and the one or more second encryption keys;

provide the encrypted payload to the first hardware processor and use the first hardware processor to digitally sign the encrypted payload using the first encryption key, wherein the first encryption key is not accessible to the at least one second hardware processor; and transmit the signed encrypted payload to the second device.

11. The system of claim 10, wherein the first hardware processor is isolated from the at least one second hardware processor to prevent access by the at least one second hardware processor to the first encryption key and to prevent access by the first hardware processor to the one or more second encryption keys.

12. The system of claim 10, further comprising first computer-executable instructions to:

establish a trusted execution environment that is isolated from at least one component of the first device, wherein the one or more second encryption keys are established in the trusted execution environment.

13. The system of claim 10, wherein the first hardware processor stores first data indicative of the at least one second hardware processor, and prior to establishing the mutually authenticated communication channel with the second device, the first hardware processor receives second data indicative of the at least one second hardware processor and determines correspondence between the first data and the second data.

14. The system of claim 10, further comprising first computer-executable instructions to:

receive data indicative of one or more of tampering or damage associated with one or more of the first hardware processor or the at least one second hardware processor; and in response to the data indicative of the one or more of the tampering or damage, delete the first encryption key associated with the first hardware processor.

15. The system of claim 10, further comprising first computer-executable instructions to:

receive data indicative of one or more of tampering or damage associated with one or more of the first hardware processor or the at least one second hardware processor; and transmit an indication of the data indicative of the one or more of the tampering or damage to the second device.

16. The system of claim 10, further comprising first computer-executable instructions to:

determine a timestamp indicative of a time at which the acquired payload was received; and associate the timestamp with the acquired payload prior to generating the encrypted payload using the acquired payload and the one or more second encryption keys.

17. The system of claim 10, wherein the second device further comprises:

one or more third hardware processors executing second computer-executable instructions to:

establish the mutually authenticated communication channel with the first device;

establish the one or more second encryption keys with the first device;

receive the signed encrypted payload from the first device; and perform a function using the signed encrypted payload.

18. The system of claim 17, further comprising second computer-executable instructions to:

determine that the payload was received using a channel other than the mutually authenticated communication channel; and in response to receipt of the payload using the channel other than the mutually authenticated communication channel, one or more of: delete the payload or refrain from processing the payload.

19. The system of claim 17, further comprising second computer-executable instructions to:

determine that the payload was received using the mutually authenticated communication channel;

determine a lack of association between a cryptographic signature associated with the payload and the first encryption key; and in response to the lack of association, one or more of: delete the payload or refrain from processing the payload.

20. The system of claim 17, further comprising second computer-executable instructions to:

determine that the signed encrypted payload was received using the mutually authenticated communication channel;

determine that a cryptographic signature associated with the signed encrypted payload corresponds to the first encryption key; and in response to a failure to decrypt the signed encrypted payload using the one or more second encryption keys, one or more of: delete the payload or refrain from processing the payload.

\* \* \* \* \*